April 28, 1925.
J. G. MANNING
1,535,932
INDEX AND CROSS FEED MECHANISM
Filed June 23, 1924   3 Sheets-Sheet 2
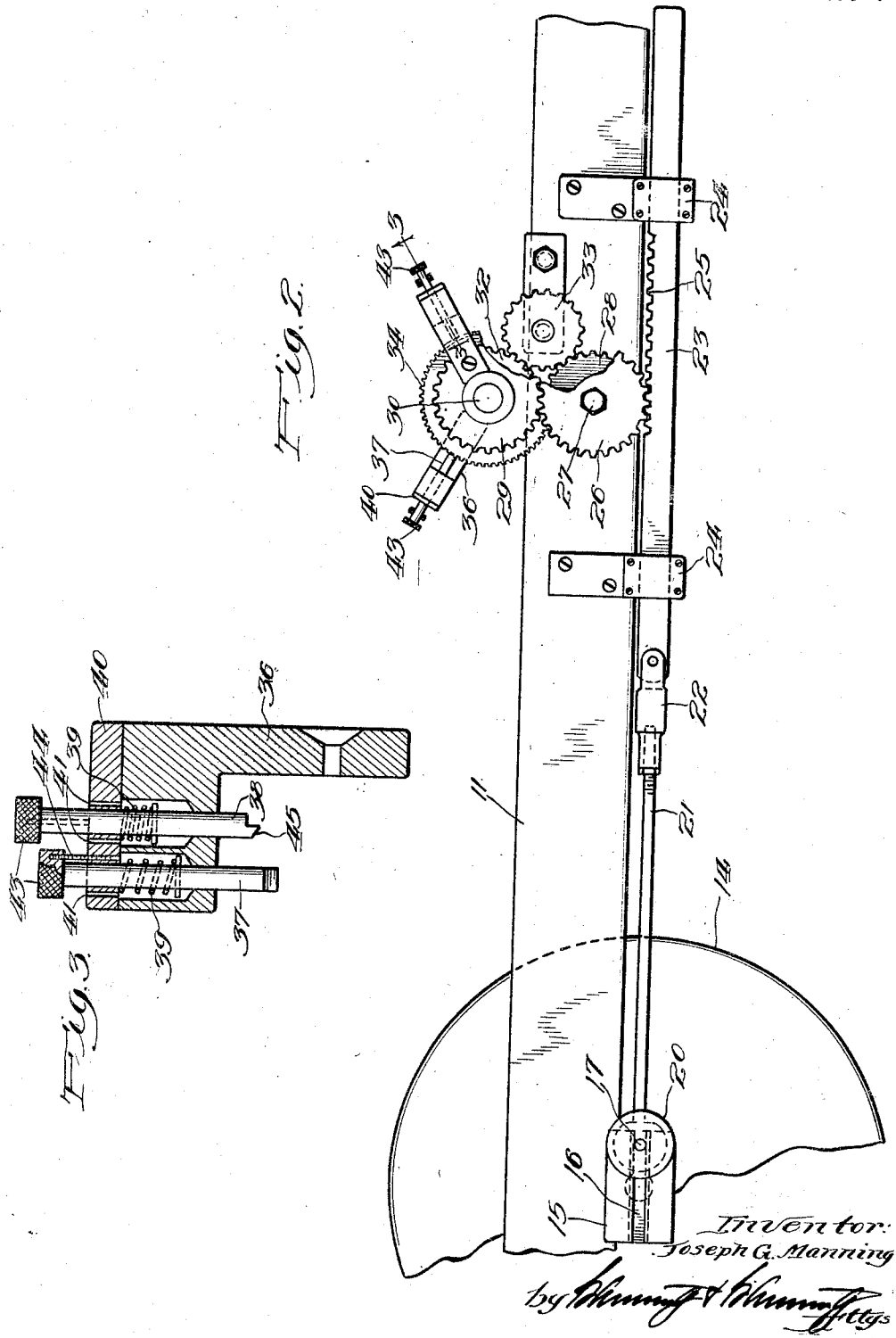

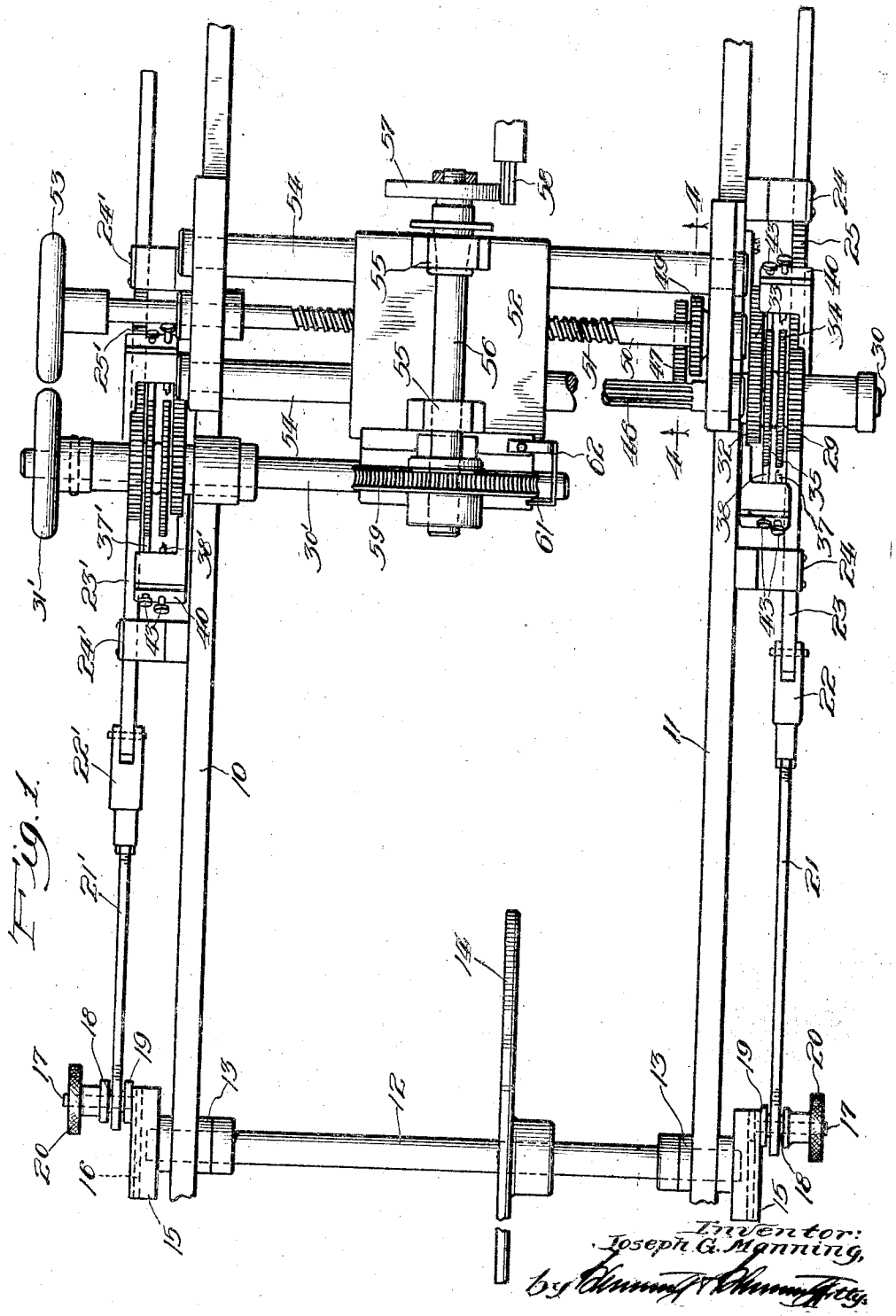

April 28, 1925.
J. G. MANNING
1,535,932
INDEX AND CROSS FEED MECHANISM
Filed June 23, 1924
3 Sheets-Sheet 3
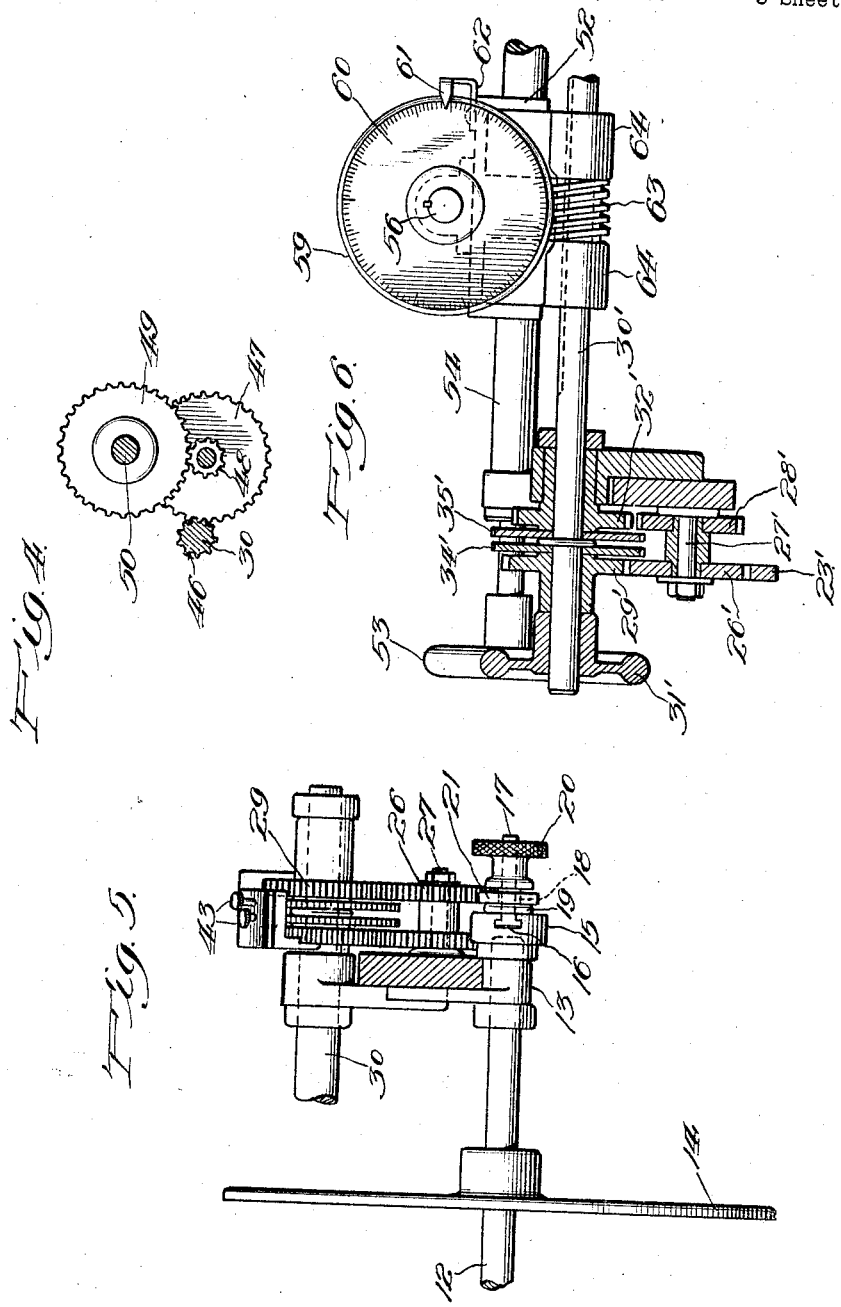

Patented Apr. 28, 1925.

1,535,932

UNITED STATES PATENT OFFICE.

JOSEPH G. MANNING, OF CHICAGO, ILLINOIS.

INDEX AND CROSS FEED MECHANISM.

Application filed June 23, 1924. Serial No. 721,649.

*To all whom it may concern:*

Be it known that I, JOSEPH G. MANNING, a citizen of the United States, residing at Chicago, in the county of Cook and State of Illinois, have invented certain new and useful Improvements in Index and Cross Feed Mechanism, of which the following is a specification.

This invention relates to an index and cross feed mechanism adapted for use with certain machinery, such, for example, as is designed for the cutting of cams. The objects attained by the present mechanism are to provide a feed for the blanks which will produce a harmonious rise or fall on cam lobes or parts thereof when both the index and cross feeds are used, and a dwell on the cams when the index feed alone is used; and also to control very accurately the movement of the index shaft in relation to the cutting tool whereby a cam may be produced which will conform to the most exacting requirements. These and other objects are attained in the present mechanism which is simple and durable in its construction as well as operation.

Referring to the drawings:

Figure 1 is a plan view showing the present index and cross feeds applied to a machine which is adapted for the cutting of cams;

Fig. 2 is a side elevation thereof;

Fig. 3 is an enlarged detail in section taken on line 3—3 of Fig. 2;

Fig. 4 is a cross section on line 4—4 of Fig. 1;

Fig. 5 is an elevation looking toward the end of the mechanism to which power is applied; and Fig. 6 is a detail in section taken in the plane of the axis of the shaft which drives the index.

The present mechanism may be associated with a machine which is shown as having a pair of longitudinal frame members 10 and 11 spaced apart a suitable distance for the travel of the cross feed carriage. A shaft 12 which extends between these two members is suitably journaled in bearings 13 thereon, and is equipped with a wheel 14 to which power is applied by friction or otherwise. Each of the opposite ends of the shaft carries a guide member 15 having an undercut slot 16 wherein is received the head of an adjustable crank pin 17. Surrounding this pin is a bushing 18 having a flange 19 abutting the guide member. A thumb nut 20 having a screw-threaded engagement with the crank pin serves to lock the pin in any desired position of adjustment longitudinally of the slot 16. The construction thus described provides a pair of bushed crank pins adjustable as desired toward and from the axis of the shaft 12. In operative connection with each of these crank pins are certain driving mechanisms one of which imparts motion to the index shaft and the other to the cross feed shaft. As these two sets of mechanisms are alike in many respects, I have designated their corresponding parts by similar reference numerals, differing only in the addition of a prime (') to those which apply to the cross feed driving mechanism. With this preliminary explanation, the description will proceed, the driving connections to the cross feed shaft being first considered.

Journaled on one of the adjustable bushings 18 is a pitman 21 equipped, by preference, with a turn buckle 22 to thereby afford an adjustable connection with a rack bar 23 which is mounted for reciprocation within suitable guides 24. For a desired portion of its length this bar is provided with teeth 25 in meshing relation with a pinion 26 carried fast on a shaft 27, to which is also secured a second pinion 28. In meshing relation with the pinion 26 is a pinion 29 having an idle mounting on a driven shaft 30. A second pinion 32 which is also loosely mounted on the shaft 30 is in meshing relation with a pinion 33 which, in turn, is drivingly connected with the pinion 28. By this construction the two pinions 29 and 32 will be caused to rotate simultaneously, but in opposite directions, with each reciprocation of the rack bar 23.

Adjacent the pinion 29 is a toothed disk 34, and a second toothed disk 35 similar thereto is arranged adjacent the pinion 32, both of these disks being mounted fast on the shaft 30. Each of the two pinions 29 and 32 carries certain pawl mechanism which co-operates with the associated disk 34 or 35, and as these two pawl mechanisms are alike, a description of but one will follow Referring to Figs. 2 and 3, an arm 36 extends radially from pinion 29 being provided with a head containing two openings in alignment with the disks 34 and 35. A pair of pins forming pawls 37 and 38 are mounted within these openings in such a manner as to present their respective toothed ends to the two disks. Normally these pawls tend to engage the disks due to the action of coiled springs 39 which are confined within the head as by means of a closure plate 40 having, by preference, two sockets 41 arranged on opposite sides of each of the enlarged central openings through which the two pawls are extended. As shown, each pawl is provided with a head 43 from which depends a pin 44 adapted (1) to present its free end either against the closure plate so as to hold the pawl in restricted position wherein it is disengaged from the associated disk, or (2) to enter one of the two sockets 41 to hold the pawl against rotation while engaged with the associated disk. The toothed end of each pawl is beveled as at 45 so as to impart a one-way motion to its associated disk, and the direction of this motion may be determined by the rotative positioning of the pawl within the head. From the preceding description it will be apparent that each reciprocatory stroke of the rack bar 23 will cause one or the other of the pawl mechanisms associated with the disks 29 and 32 to be operated with the result that a rotary feed, interrupted only by various slight pauses, will be imparted to the shaft 30.

The two pawls should, of course, be so adjusted rotatively that one or the other of the two disks 34 and 35 are subjected to motion, whenever the rack bar 23 is reciprocated. The disks 34 and 35 may advantageously be formed with teeth of slightly different number so as to be subjected to a predetermined range of movement with each oscillation of the two pawl arms 36. With such a construction the operator is enabled to control still further the movement which is communicated to both the index and cross feed shafts.

Up to this point it has been possible to describe together the two sets of driving mechanisms because they are substantially alike in all the respects pointed out. It will now be necessary to proceed separately with the explanation of their remaining parts which are differently arranged in order to cooperate with the cross feed and index shafts.

Considering first the mechanism which drives the cross feed shaft. motion is communicated from the shaft 30 as by means of teeth 46 which mesh with a pinion 47 (see Fig. 4) having combined therewith a smaller pinion 48 in mesh with a larger pinion 49 that is keyed to the cross feed shaft 50. As is usual, this latter shaft is formed with screw threads 51 for a substantial portion of its length so as to move a carriage 52 which is adapted for travel transversely between the two frame members 10 and 11. Manual adjustments of the carriage are provided for by a hand wheel 53 attached to one end of the cross feed shaft and operable freely when the pawls 37 and 38 are retracted into disengaging position.

This carriage is mounted upon suitable guides 54 and is equipped with bearings 55 for an index shaft 56 whose axis is transverse to the cross feed shaft. One end of the index shaft is designed for the mounting thereon of a cam blank 57 adjacent which is an appropriate milling or cutting tool 58. At the opposite end of the index shaft is a worm wheel 59 having one end face 60 marked with graduations of a desired character. A pointer 61 arranged adjacent these markings is carried by an arm 62 which is secured to the carriage. The cross feed shaft is operated by means of a transverse shaft 30' whereon is keyed a slidable worm gear 63 in meshing relation with the worm wheel 59. This worm is confined in place between a pair of spaced bearings 64 depending from one end of the carriage and affording a sliding mounting for the shaft 30'. Rotary movements are communicated to the transverse shaft 30' by a train of connections which may correspond with those already described for driving the cross feed shaft. It may be noted, however, that the index feed shaft 30' is located with reference to the driving shaft 12 somewhat closer than the cross feed shaft 50 in order that a sufficient clearance may be provided for all the operating parts. For manipulative adjustments a hand wheel 31' may be associated with the shaft 30' as shown.

I would have it noted that the present feeding mechanism is one which will assure of a very accurate movement of the cross feed and index shafts in accordance with a predetermined timed relation. This is subject to adjustment by varying the positions of the crank pins on the driven shaft 12, whereby the range of movement of the parts operated thereby is changed. It is possible with a machine embodying the present mechanism to produce a harmonious rise or fall on the cam lobes, or parts of the cam lobes, formed from a blank 60, when both the index and cross feeds are used. This movement of the index products a series of feeds alternating with no-feeds with the feed time always greater than the no-feed time. It will be noted further that the feed time results in an accelerated movement from the no-feed time to the apex, and a decelerated movement from the apex down to the next ensuing no-feed time, due to the motion which is imparted from the cranks on the shaft 12. The same holds true for the cross feed action and it is not necessary for the cross feed time to be in harmony with the index feed time.

The principles underlying my invention as hereinbefore set forth and which endow the mechanism with the characteristics noted, are, of course, susceptible of embodiment in forms other than that which is herein shown, and in so far as any modifications or alterations thereof embody the features of my invention as defined by the claims below, I would have them included within the scope of this patent.

I claim:

1. In an index and cross feed mechanism, operating means therefor comprising, in combination an index shaft, a cross feed shaft, a common drive shaft, a pair of reciprocable bars each connected adjustably therewith, and connections from one reciprocating bar to the cross feed shaft and other connections from the other reciprocating bar to the index shaft, each of said connections including a double pawl device wherein one pawl only at a time is operated, but wherein a predetermined movement range is obtained by operation of the other pawl, substantially as described.

2. In an index and cross feed mechanism, operating means therefor comprising, in combination, a slidable carriage, a cross feed shaft therefor, an index shaft mounted on the carriage, a worm for operating the index shaft, a common driving shaft having a pair of adjustable cranks, and connections leading from the cross feed shaft and the worm to the two cranks, said connections including in each instance an adjustable pawl device, and a reciprocable drive therefor to which a desired range of movement is imparted from one of the adjustable cranks, substantially as described.

3. Operating means for an index and cross feed mechanism comprising, in combination, a reciprocable rack bar, a pinion adapted to be oscillated thereby, a second pinion co-axial therewith and driven thereby, a driven shaft whereon are loosely mounted third and fourth pinions, the former in mesh with the first pinion, a fifth pinion arranged intermediately of the second and fourth pinions to thereby impart to the latter an oscillatory movement which is reverse to that of the third pinion, a pair of disks carried fast by the driven shaft, one associated with each of the third and fourth pinions, pawl mechanism associated with the third and fourth pinions adapted to engage with one of the two disks at a time to thereby impart an intermittent rotation to the driven shaft in the direction desired, and a carriage having a cross feed shaft rotatably connected with the driven shaft and adapted to be turned in response to movements of the latter, substantially as described.

4. In an index and cross feed mechanism, operating means therefor in which is combined a reciprocable rack bar, a driven shaft, pawl mechanism associated with the shaft, intermeshing pinions forming an operative connection between the rack bar and the driven shaft in such a manner as to cause rotation of the latter in either direction desired, a sliding carriage, means adapted to transfer motion from the driven shaft to the carriage, an index shaft mounted on the carriage, and operating connections for rotating the index shaft including an assembly of pawl mechanism and intermeshing pinions the same as those forming part of the drive for the cross feed shaft, substantially as described.

5. In an index and cross feed mechanism, operating means therefor in which is combined an index shaft, a cross feed shaft, a pair of driven shafts, one connected drivingly with the index shaft and the other with the cross feed shaft, a pawl mechanism associated with each driven shaft, and including in each instance a pair of toothed disks carried fast by each driven shaft, a pair of pinions loosely mounted on each driven shaft, means for oscillating the two pinions simultaneously in reverse directions, and a pair of pawls mounted on each pinion, one adapted to engage with each disk, but only one at a time, whereby two pawls adapted for movement toward and from each other are at all times engaged with each disk in a manner to impart thereto a substantially continuous movement, substantially as described.

6. An index and cross feed mechanism in which is comprised a slidable carriage, a screw shaft for operating the same, an index shaft mounted on the carriage, a worm for operating this latter shaft, operating means for the screw shaft and worm each independent of the other, said means including a common drive shaft, and a separate pawl mechanism in which is comprised a pair of toothed disks and two pairs of pawls associated therewith and adapted to be moved simultaneously toward and from each other to impart a substantially continuous movement to either disk, substantially as described.

7. In a machine of the kind described, pawl mechanism in which is included a pair of toothed disks mounted fast on a driven shaft, a pair of pinions mounted loosely on the same shaft, means for oscillating the two pinions simultaneously in reverse directions, an arm extending radially from each pinion and provided with a head adjacent the two disks, a pair of pins forming pawls slidably and rotatably mounted in each head, the acting end of each pawl being toothed to impart to the associated disk a rotative movement in either direction, and means associated with each pawl for holding the same in a desired position of rotative adjustment or for maintaining the pawl in a position of disengagement, relative to its associated disk, substantially as described.

8. In a mechanism of the kind described, the combination of a driven shaft whereon is secured fast a pair of toothed disks, a pair of pinions loosely mounted on the same shaft, means for imparting simultaneously to the two pinions reverse oscillatory movements, an arm extending radially from each pinion and provided with a pawl carrying head, a pair of pawls mounted in each head and adapted to engage with the two disks, and means for holding either pawl in a position of disengagement or in a position of rotative adjustment, relative to its associated disk such as to impart to the disk a rotative movement in the desired direction, substantially as described.

JOS. G. MANNING.

Witness:
EPHRAIM BANNING.